March 6, 1934.      L. C. BROECKER      1,949,823
METHOD OF MOLDING A RUBBER VALVE ON THE
CENTER PIN OF PNEUMATIC VALVE INSIDES
Filed April 30, 1932      2 Sheets-Sheet 1
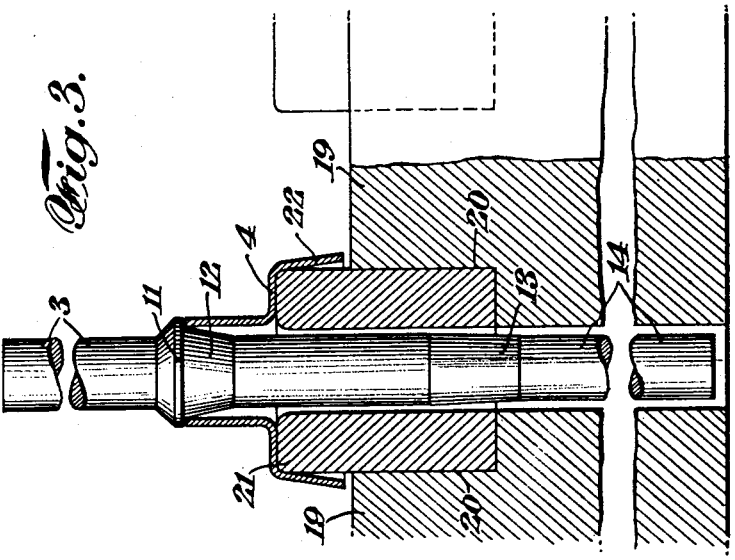
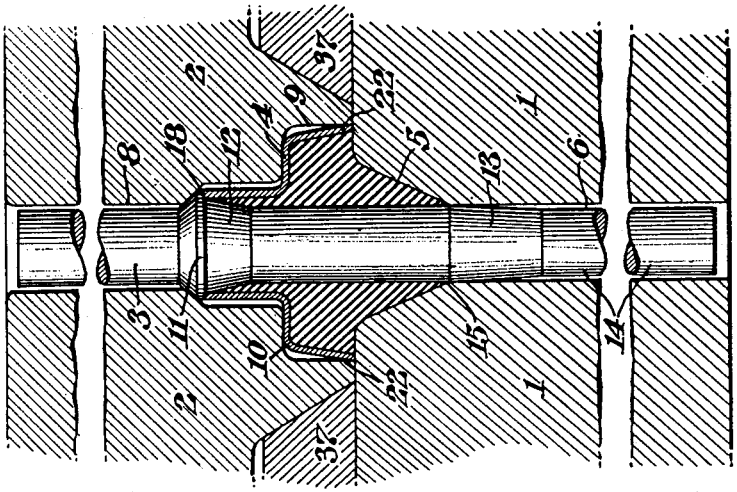
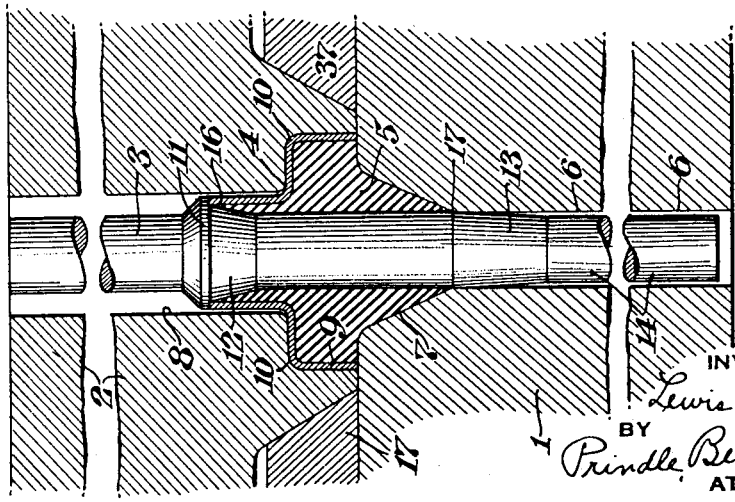
INVENTOR
Lewis C. Broecker
BY
Prindle, Bean & Mann
ATTORNEY

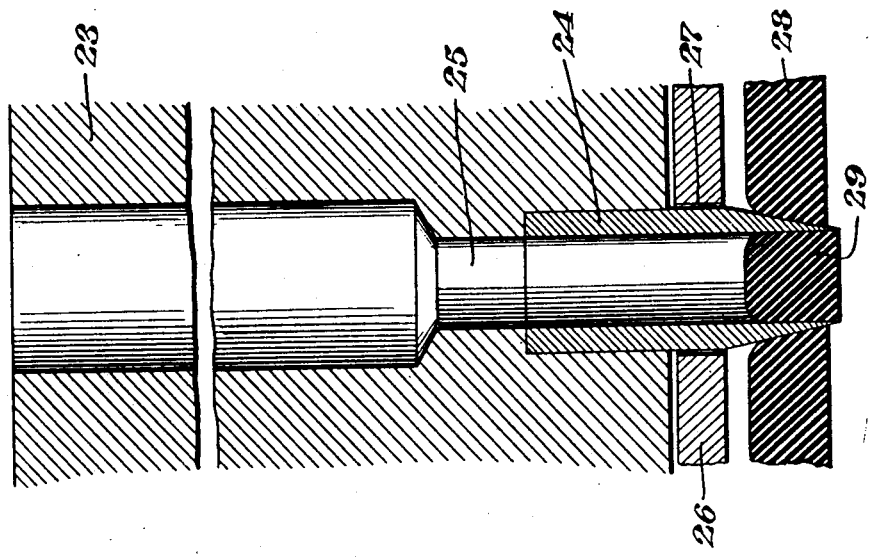

Patented Mar. 6, 1934

1,949,823

UNITED STATES PATENT OFFICE 1,949,823

METHOD OF MOLDING A RUBBER VALVE ON THE CENTER PIN OF PNEUMATIC VALVE INSIDES

Lewis C. Broecker, Bridgeport, Conn., assignor to Bridgeport Brass Company, Bridgeport, Conn., a corporation of Connecticut Application April 30, 1932, Serial No. 608,440

8 Claims. (Cl. 18—59)

This invention relates to center pins for tire valve insides construction and the method of molding valve washers thereon.

In inside constructions for valves for pneumatic articles, such as tires and the like, the main valve washer or gasket is usually provided upon the center pin element. This center pin is thin and rather delicate, but forms a very essential and important part of the valve construction as a whole. It is usually provided with a valve which is normally held in closed position against a valve seat by means of the internal pressure as well as a spring or other resilient member, but may be forced to open position by the application of pressure during inflation or by the application of mechanical pressure to the end of the center pin. In the center pin to which this invention relates, this valve is in the form of a rubber gasket or washer which is molded to the center pin so as to be securely held and positioned thereon. The construction of the complete center pin is similar to that shown in my application for patent filed July 1, 1931, Serial Number 548,063. In molding these valves on the center pin in commercial production, it is important that the parts be introduced and removed from the mold rapidly and easily and to provide absolutely tight joints to prevent the rubber, rendered fluid by heat and pressure, from escaping and forming fins or excrescences that require removing. The parts must come out of the mold cleanly, and the method should be such that injury to and bending of the small delicate metal parts is impossible.

To the accomplishment of the foregoing and. such other objects as may hereinafter appear, this invention consists in the method or process and construction hereinafter described and then defined in the appended claims, reference being had to the accompanying drawings for purposes of assisting in the disclosure, it being expressly understood that various changes may be made in practice within the scope of the claims without digressing from my inventive idea.

In the drawings—

Figure 1 represents diagrammatically, a cross sectional view through parts of the mold with the center pin and molded rubber valve seat thereon, in the position assumed at the completion of the operation.

Figures 2 and 3 represent diagrammatically cross sectional views through parts of a modified mold construction, Figure 2 illustrating the final molding operation and Figure 3 illustrating a preliminary operation.

Figure 4 is a diagrammatic cross section, illustrating means and method for perforating the sheet of rubber and placing the same on the upper mold part.

Referring now to the drawings, the numeral 1 designates the lower part of the mold and the numeral 2 the upper part of the mold. 3 designates the center pin on which is mounted the sheet metal cup 4 for holding the rubber valve gasket or member 5. The lower mold part 1 is provided with the hole or bore 6 which terminates in an upwardly diverging or frusto-conical cavity 7 at its upper end. The upper mold part 2 is provided with the hole or bore 8 which terminates in an enlarged recess 9 having rounded corners or edges 10 corresponding in size and configuration to the sheet metal cup 4. The center pin is formed with an annular flange or shoulder 11 against which the upper edge of the cup 4 abuts when assembled therein. Immediately below the shoulder 11 the center pin is provided with the enlarged bevelled portion 12. Then below the line of the upper surface of the lower part 1 of the mold, the center pin 3 is provided with the tapered or bevelled portion 13 which leads to a portion 14 of the center pin slightly less in diameter than the part above the bevelled or tapered portion 13. The upper portion of the tapered or bevelled part of the center pin 13 is slightly greater in diameter than the diameter of the hole or bore 6 in the lower part 1 of the mold so as to form a tight joint between the center pin and the mold at the lower edge of the rubber valve gasket member as at 15.

When the cup 4 is assembled upon the center pin with its upper edge against shoulder 11, the reduced neck 16 thereof fits tightly against this shoulder and also against the upper and wider portion of the tapered or bevelled part 12 of the center pin, forming a tight joint at this place to prevent the rubber from escaping. The diameter of the hole or bore formed in the lower part 1 of the mold being slightly greater than the diameter of the lower portion 14 of the center pin allows the pin to enter freely until the tapered or bevelled portion 13 engages the sides of the upper portion of said bore or hole.

The method is practiced as follows: A plurality of the cups 4 are inserted into the cavities or recesses formed in the upper part 2 of the mold and pressed home by means of a plate having pins of a suitable diameter and the same spacing as the cavities or recesses in the mold. A sheet of uncured rubber of suitable thickness is then placed upon the lower part 1 of the mold. This rubber sheet has previously been punched with holes slightly larger than the diameter of the center pins 3 and spaced the same as the cavities or recesses in the upper part 2 of the mold. This upper part 2 of the mold is then placed in position upon this rubber sheet. A plurality of center pins are properly inserted into the holes or bores 8 in the upper part 2 of the mold and pushed or forced downwardly until the upper ends of the pins are flush with or in the same plane as the top surface of the upper mold part 2 and with the shoulders 11 against the necks 16 of the cups. The mold is then placed in a curing press where the necessary and desired pressure and heat are applied to cause the rubber to flow into and fill the restricted available mold cavities and to cure the rubber in its molded form. The surplus rubber overflows and is forced into the recesses 37 provided in one of the mold parts. The mold is then parted or opened and the center pins with the cups and the valve seat members 5 remain in the upper part 2 of the mold. These center pin assemblies are then stripped from the mold part 2 by means of a plate having short pins slightly less in diameter than the bore or opening 8 and spaced in accordance with said bores or openings.

The method therefore includes the application of heat and pressure to a mass of uncured rubber to mold and cure the rubber around a portion of the valve pin so that the cured rubber washer is permanently secured to the valve pin and held in proper position thereon. The center pin itself includes a cup member with the molded valve washer or gasket positioned therein and provided with an extended seating surface and an upwardly extending conical projection.

The alternative molding arrangement of Figure 2 principally differs from the arrangement of Figure 1, in that the hole or bore 8 is shouldered or of reduced diameter at 18, said shoulder at 18 being arranged to contact with the annular flange or shoulder 11 of the pin 3.

To facilitate the operation of this mold, a loading plate is used as shown in Fig. 3. The loading plate 19 is provided with cavities 20 receiving the bushings 21, said cavities being spaced to coincide with the cavities in the upper mold 2.

In operation, the sheet metal cups 4 and the center pins 3 are placed in position on the loading plate 19, and the upper part 2 of the mold is placed over the loading plate and pressed down upon it. The bushings 21 press the cups 4 home into the mold cavities 9. The loading plate 19 and the upper part 2 of the mold are now separated, the cups 4 and center pins 3 staying in the mold due to the tight fit of the cups 4 in the cavities 9.

The upper mold half 2 is then placed so that the projecting pins extend upwardly. Then a sheet of green rubber (not shown) of suitable thickness and perforated with the center pin receiving holes of the same spacing as the cavities or recesses 9 in the mold, is placed on the face of said upper mold portion 2.

Finally the lower mold half 1 is placed in position on the upper mold half 2, and the whole mold is placed in the curing press where the necessary heat and pressure is applied in the manner previously described.

The remaining operations are substantially as already described in connection with the embodiment of Figure 1. As shown in Figures 2 and 3, to facilitate insertion and removal of the cups 4 from the cavities or recesses 9, as well as to make a better joint between the wall of the cup 4 and the mold cavity 9, the sides of the cup are tapered slightly as indicated at 22. The large diameter 22, being a trifle larger than the diameter of the cavity 9, will make a tight joint when the cup is pressed into position.

The placing of the perforated sheet of green or uncured rubber on the upper mold half 2 presents certain difficulties because the mold is hot during the loading operation and the rubber sheet is quite soft and stretches out of shape very readily so that the edges of the perforated holes in the rubber sheet contact with the center pins 13 with the possibility of bending these comparatively slight and delicate members, as well as to loosen the sheet metal cups 4 which have been previously placed in the mold. In addition, the heat from the mold is transmitted to the center pins 3 with the resultant tendency on the part of the green rubber to stick to the pins when it touches them and interfere with the molding process.

To overcome these above mentioned difficulties and to facilitate the operation of the molding process, I have invented a new means and method for perforating and placing a sheet of rubber in position, which includes a combination perforating and placing or positioning plate as shown in Figure 4 of the drawings. In that figure, the numeral 23 designates a plate of suitable size and thickness which is provided with a plurality of inset tubular cutters 24 which extend beyond the face of the plate 23 and fit within suitable cavities 25 therein. These cutters are positioned and spaced to correspond with the bores or cavities in the mold parts 1 and 2; and cut the center pin receiving holes. 26 designates a stripper plate which is positioned on the face of the cutting plate 23 and provided with a plurality of holes or apertures 27 of sufficient size, and so placed as to receive the tubular cutting members 24. 28 designates a sheet of green rubber on which the cutting plate 23 is placed and sufficient pressure applied to cause the cutting members 24 to cut through the sheet or rubber leaving the slugs 29 within the tubular cutters. These slugs 29 are pushed out of the cutters by means of a plate (not shown) having a set of pins of proper size to fit loosely in the bores of the cutters and properly spaced to that end. The cutting plate with the perforated sheet of rubber is then placed over part 2 of the mold, shown in Figures 1 and 2 of the drawings, it being understood that the center pins 3 have already been placed in proper position. The projecting parts 14 of the center pins pass through the bores of the cutters and the cutting plate 23 to a considerable extent, but the cutting edge of the cutters is prevented from coming into contact with the mold part 2 by the intervening rubber sheet. The rubber sheet is then stripped from the cutters by the movement of the stripper plate 26 relatively thereto which forces the rubber sheet against the face of the mold part 2. The perforating and positioning device is then withdrawn or removed leaving the perforated sheet of rubber in position against the face of the mold part 2 and over the center pins 3 so that the mold part 1 may be placed in position to proceed with the molding and curing operation previously described.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

What I claim is:

1. The method of assembling center pins for pneumatic valve inside constructions and molding valves thereon which includes positioning a cup member in a cavity in one part of a two part mold, placing a mass of uncured rubber between the two parts of said mold adjacent said cup member, positioning a center pin in said cup member and through said mass of uncured rubber and providing a tight engagement between said cup member and said center pin, applying heat and pressure to said mold so as to force the rubber into the cup shaped member and around said center pin and to cure said rubber so as to form a cured rubber valve on said center pin.

2. The method of assembling center pins for pneumatic valve inside constructions and molding valves thereon which includes pressing a cup member into a cavity in one part of a two part mold, the rim of which cup is of greater diameter than the cavity in the mold, placing a mass of uncured rubber between the two parts of said mold adjacent said cup member, positioning a center pin in said cup member and through said mass of uncured rubber and providing a tight engagement between said cup member and said center pin, applying heat and pressure to said mold so as to force the rubber into the cup-shaped member and around said center pin and to cure said rubber so as to form a cured rubber valve on said center pin.

3. The method of assembling center pins for pneumatic valve inside constructions and molding valves thereon which includes pressing a cup member into a cavity in one part of a two part mold, placing a mass of uncured rubber between the two parts of said mold adjacent said cup member, positioning a shouldered center pin in said cup member and through said mass of uncured rubber and providing a tight engagement between said cup member and said center pin by pressing upwardly upon the rim of the cup with one mold member and downwardly upon the shoulder of said pin with another mold member, applying heat and pressure to said mold so as to force the rubber into the cup-shaped member and around said center pin and to cure said rubber so as to form a cured rubber valve on said center pin.

4. The method of perforating and positioning a sheet of rubber in mold parts for molding valves on center pins for pneumatic valve inside constructions, which includes perforating a sheet of rubber by means of a plate having a plurality of tubular cutting members arranged in position to correspond to the position of the center pins in the molds, placing said plate over part of the mold so that the center pins positioned therein pass through the holes or perforations in said rubber sheet, stripping the rubber sheet from the cutters and moving it against the face of the mold part and then completing the molding and curing operation.

5. Method of molding and curing a rubber valve on the center pin of pneumatic valve insides which includes perforating a layer of uncured rubber by means of a tubular cutter telescopable over said pin; placing said rubber layer adjacent one part of a separable part mold with the tubular cutter perforating the rubber sheet and telescoped over the center pin projecting from and carried with said mold part; stripping the rubber sheet off the cutter and onto the center pin and removing the cutter; placing the other mold part against said rubber sheet with the center pin received into a bore therein; and applying heat and pressure to the mold parts and rubber sheet to close the mold and force the rubber into a mold cavity surrounding the pin and to vulcanize the valve thus formed.

6. Method of molding and curing rubber valves on center pins and in cups on said pins of pneumatic valve insides which includes positioning the center pin and surrounding cup in a cavity in one part of a separable part mold with the center pin projecting out of said cavity beyond the face of the mold part; perforating a layer of uncured rubber with a tubular cutter; locating said layer adjacent the face of said mold part with the tubular cutter telescoped over the projecting center pin; stripping the rubber off the cutter and onto the center pin and removing the cutter; applying the other mold part to the first with the rubber layer located between them and with the center pin extending into a suitable bore in said mold part; and applying heat and closing pressure to the mold parts and to the rubber layer to force the uncured rubber into the cup and around the center pin to form and cure the rubber valve.

7. Method of molding and curing rubber valves on center pins and in cups on said pins of pneumatic valve insides which includes locating a center pin and surrounding cup axially threaded by said pin in a cavity of the one mold part with the pin projecting from the cavity beyond the face of the mold part, the pin having a shoulder outside of and bearing against the cup; perforating a layer of uncured rubber with a tubular cutter; locating said layer adjacent the face of said mold part with the tubular cutter telescoped over the projecting center pin; stripping the rubber off the cutter and onto the center pin and removing the cutter; applying the other mold part to the first with the rubber layer located between them and with the center pin extending into a suitable bore in said other mold part; and applying heat and pressure to the mold parts and to the rubber layer and carrying the cup and center pin along with the related mold part so that the shoulder on the pin is in contact with the cup and so that the uncured rubber is forced into the cup and around the center pin to form and cure the rubber valve in connection therewith.

8. Method of molding and curing a rubber member on a part of a pneumatic valve insides which carries said rubber member, said method including perforating a layer of uncured rubber by means of a tubular cutter telescopable over the carrying-part for said rubber member; placing said rubber layer adjacent one part of a separable part mold with the tubular cutter perforating the rubber sheet and telescoped over said carrying-part projecting from the said mold part; stripping the rubber sheet off the cutter and onto the carrying-part and removing the cutter; and placing the other mold part adjacent said rubber sheet with the carrying-part received into a bore therein; and aplying heat and pressure to the mold parts and rubber sheet to force the rubber into a mold cavity surrounding the carrying-part to form and cure the rubber member thereon.

LEWIS C. BROECKER.